United States Patent Office 3,037,781
Patented June 5, 1962

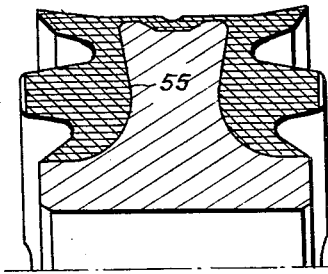
Fig. 7
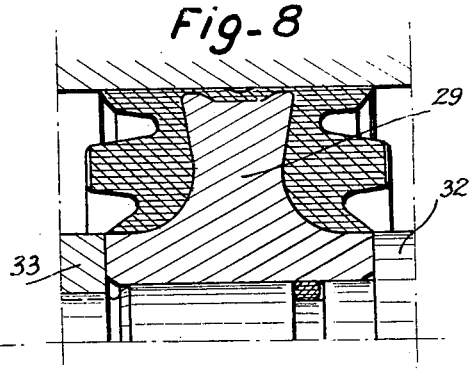
Fig. 8
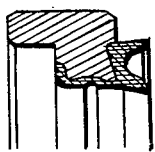
Fig. 9
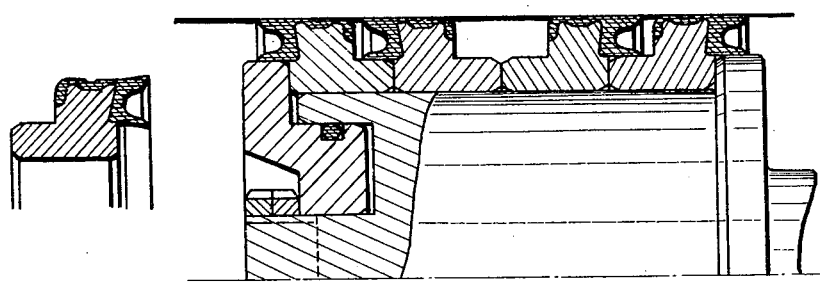
Fig. 11
Fig. 10
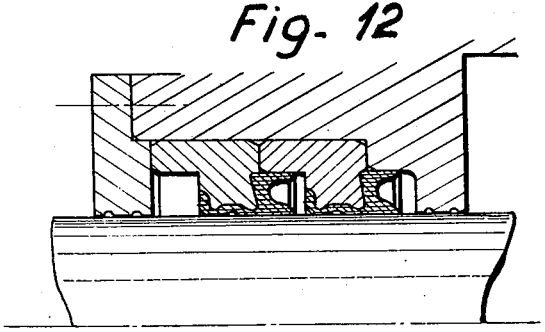
Fig. 12

3,037,781
PLUNGER AND ROD PACKINGS
Lucien Péras, Billancourt, France, assignor to Regie Nationale des Usines Renault, Billancourt, France
Filed May 5, 1959, Ser. No. 811,098
Claims priority, application France May 19, 1958
5 Claims. (Cl. 277—182)

This invention relates to packings or seals of the type described and illustrated in copending application Ser. No. 718,358 of February 28, 1958, now Patent No. 2,994,571, and adapted to provide a tight joint in applications involving the sliding movement of a rod, plunger or piston in a cylinder containing a fluid under pressure such as pumps, hydraulic or pneumatic cylinders, or like devices.

It is the object of present invention to improve packings of the type described in the above patent, by modifying some details of the forms of embodiment described and shown in the said patent, the chief advantage of these modifications, which appeared in the light of practical experiences, being an increased efficiency and reliability of the packings thus altered.

With reference to the accompanying drawings there will be described hereinafter a few forms of embodiment of the packings constituting the subject-matter of this invention. In the drawings:

FIGURES 7 and 8 are similar views showing a bi-directional piston packing also providing a shock-damping action;

FIGURES 9 and 10 are half-sectional views showing a packing adapted, in combination with one or more same packings, to constitute a fluid-tight assembly;

FIGURE 11 is another half-sectional view showing a piston of which the bi-directional sealing element consists of a plurality of packings of the type illustrated in FIG. 9, and FIGURE 12 is a similar view of a gland-packing seal also made up of elements of the type shown in FIG. 10.

Figure 1:
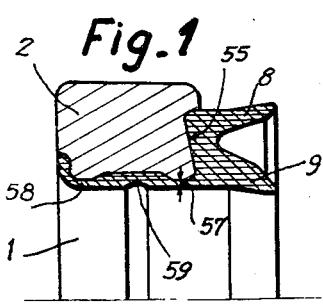
FIGURES 1 and 2 are cross-sectional views showing a gland-packing separately and after its mounting on a rod or plunger.
Figure 2:
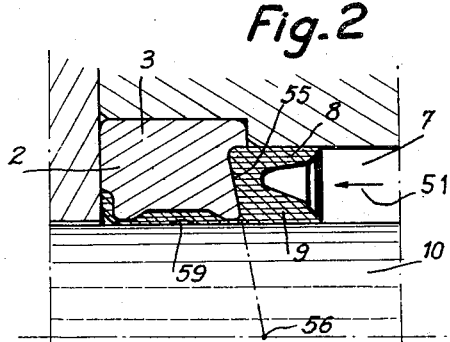

There is shown in FIGS. 1 and 2 a gland-packing comprising a resilient portion 1 adhering by curing or vulcanization of a metal reinforcing support, frame or ring 2 formed with a fixation annular projection 3 adapted to fit in the cage or like recess 4 of a case or like member. The operative or active resilient portion 1 consists of a relatively thin annular body extending on the metal support in the direction of the sliding movement and engaging the rod 10 extending through the packing. It comprises, on the other hand, on the packing side facing the fluid-pressure chamber 7, two curved sealing lips constituting, after the packing has been fitted in position, the one a static lip 8 and the other the sliding-contact lip 9 of the gland-packing (in relation to the rod 10).

The lips 8, 9 are curved when inoperative (FIG. 1) so as to be resiliently stressed when mounted (FIG. 2), and they extend throughout their length up to the metal support to provide a substantially plane face and bear continuously on the surfaces with which they co-operate.

Furthermore, the side face 55 of the metal reinforcing support supporting the base of each lip against the fluid pressure consists of a substantially plane face inclined to the rear from the sliding lip 9 to the static lip 8, thus forming a frusto-conical surface having its vertex at 56 (FIG. 2).

Consequently, the pressure exerted in the direction of the arrow 51 will press the resilient material at the root or base of the lips according to the inclination of this surface 55, that is, towards the static side of the packing, thus preventing the material from being forced toward the sliding side, in this case between the rod 10 and the metal support 2. In addition, the lips will withstand the pressure without undergoing any appreciable alteration in their shape, and these lips are efficiently preserved.

For the same purpose the thickness 57 of the annular packing body at the root of the sliding lip must be reduced to a minimum.

This reduction in thickness is also contemplated at 58, that is, at the opposite end of the annular packing body, but in this case the purpose is to permit, in combination with the reduction in thickness at 57, the anchoring of the annular body in the metal support with a view to reinforce their mutual binding.

A preferred arrangement consists in providing one internal groove 59 in the annular packing body so as to retain therein a small reserve of lubricant but without constituting a weakness factor in the packing body.

Figure 3:
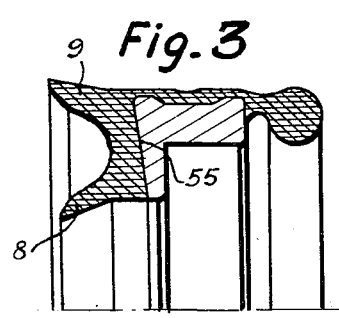
FIGURES 3 and 4 are similar views of a piston packing designed for unidirectional tightness.
Figure 4:
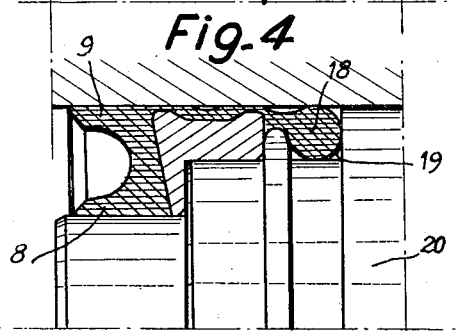
Figure 5:
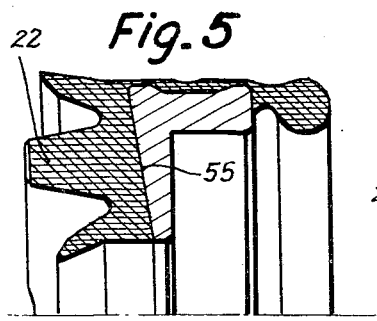
FIGURES 5 and 6 are similar views showing the same piston packing but adapted in this case to act as a shock-damping member upon completion of its stroke.
Figure 6:
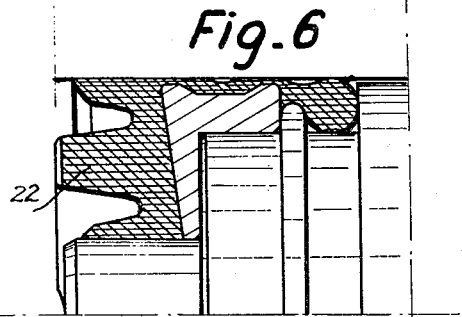

Of course, these arrangements are also applicable to piston packings, such as described in the above patent, whether to unidirectional piston packings (FIGS. 3 and 4) formed at their rear portion with a resilient bead 18 permitting its anchoring in a groove 19 of piston 20, or to a piston packing of same type (FIGS. 5 and 6) having formed between its lips a shock-absorbing annular pad 22 adapted to damp out shocks at the end of the piston stroke, or to bi-directional piston packings providing at the same time a shock-damping action, as shown in FIGS. 7 and 8, vulcanized on a metal support constituting at the same time the piston body 29 locked against a shoulder 32 of the piston rod by means of a nut or like member 33.

It will be seen that in all these forms of embodiment where the same details as those of the gland-packing of FIG. 1 are reproduced the lateral faces 55 of the metal supports or reinforcing members which support the root or base of the lips are always either inclined to the rear of these lips in the direction from the sliding lip to the static lip, or at least, in the specific example illustrated in FIGS. 7 and 8 wherein the reinforcing element 29 constitutes at the same time the piston body, on the major portion of their surface.

These arrangements are also found in the packings illustrated in FIGS. 9 and 10 of the drawings, the substantially angle-sectioned reinforcing members and the arrangement of their active resilient portion permitting, as described in the above patent, any desired combinations with a view to constitute a device having multiple sealing zones either in the case of a piston (FIG. 11) or in the case of a gland-packing (FIG. 12).

Of course, various modifications and alterations may be brought to the forms of embodiment illustrated and described herein, without however departing from the spirit and scope of the invention as set forth in the appended claims.

I claim:
1. A packing adapted to form a fluid-tight joint between two relatively sliding members, said packing comprising a metal support and an operative body of resilient material secured to said metal support, said support being formed with an annular surface and being adapted to impart resistance to deformation to said body, said operative body comprising an annular portion extending axially along said annular surface to form a guide surface between said members, said annular portion having an extension on at least one side of the support intended to face the fluid under pressure, said extension carrying at least one tapering sliding sealing lip directed away from said annular portion and having a sealing surface extending at an obtuse angle in relation to said annular portion when free, so as to be pre-stressed when mounted, said annular portion being of substantially less thickness than the average thickness of said sliding lip, and said support having a supporting surface axially behind said lip which is entirely inclined rearwardly with respect to said lip, and away from the free end of said lip.

2. A packing as defined in claim 1, wherein said metal support is formed with radially-extending ribs adjacent the axially-spaced ends of said annular surface and the part of said annular portion overlying said ribs is of reduced thickness in relation to the remainder of said annular portion.

3. A packing as defined in claim 1, wherein said metal support is formed with radially-extending ribs adjacent the axially-spaced ends of said annular surface and the part of said annular portion overlying said ribs is of reduced thickness in relation to the remainder of said annular portion, said extension further comprising a static sealing lip adapted to engage the member carrying said packing.

4. A packing as defined in claim 1, wherein said metal support is formed with radially-extending ribs adjacent the axially-spaced ends of said annular surface and the part of said annular portion overlying said ribs is of reduced thickness in relation to the remainder of said annular portion, and wherein the part of said portion between said ribs is formed with a radially-outwardly-extending groove.

5. A packing as defined in claim 1, wherein said annular portion forms a cylindrical guide surface over the major part of its length.

References Cited in the file of this patent

UNITED STATES PATENTS

| | | |
|---|---|---|
| 2,387,182 | Procter | Oct. 16, 1945 |
| 2,470,925 | Frederickson | May 24, 1949 |
| 2,571,486 | Reynolds | Oct. 16, 1951 |
| 2,772,931 | Biedermann | Dec. 4, 1956 |

FOREIGN PATENTS

| | | |
|---|---|---|
| 1,168,857 | France | Sept. 1, 1958 |